United States Patent
Pierce et al.

(10) Patent No.: US 7,196,885 B2
(45) Date of Patent: Mar. 27, 2007

(54) APPLIANCE LEAKAGE CURRENT INTERRUPTER AND NIGHTLIGHT COMBINATION

(75) Inventors: Michael M. Pierce, Richmond, VA (US); Brian R. Sullivan, Richmond, VA (US); Roy B. Bates, Glen Allen, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 307 days.

(21) Appl. No.: 10/421,606

(22) Filed: Apr. 23, 2003

(65) Prior Publication Data
US 2004/0212935 A1 Oct. 28, 2004

(51) Int. Cl.
*H02H 3/00* (2006.01)

(52) U.S. Cl. ........................................ 361/42
(58) Field of Classification Search ............. 361/42, 361/45, 78; 335/18
See application file for complete search history.

(56) References Cited

U.S. PATENT DOCUMENTS

| | | | |
|---|---|---|---|
| 4,550,358 A | 10/1985 | Crowley et al. | |
| 4,797,772 A | 1/1989 | Kaplanis | |
| D325,380 S | 4/1992 | Rao et al. | |
| 5,148,344 A | 9/1992 | Rao et al. | |
| 5,198,955 A * | 3/1993 | Willner | 361/42 |
| D356,066 S | 3/1995 | Rao et al. | |
| 5,434,509 A | 7/1995 | Blades | |
| D363,463 S | 10/1995 | Rao et al. | |
| 5,465,198 A | 11/1995 | Kellogg | |
| 5,642,248 A | 6/1997 | Campolo et al. | |
| 5,661,623 A * | 8/1997 | McDonald et al. | 361/42 |
| D391,922 S | 3/1998 | Aromin | |
| 5,757,598 A | 5/1998 | Aromin | |
| D400,172 S | 10/1998 | Aromin | |
| D400,174 S | 10/1998 | Shatkin | |
| 5,841,617 A * | 11/1998 | Watkins et al. | 361/106 |
| 5,943,199 A * | 8/1999 | Aromin | 361/42 |
| D414,747 S | 10/1999 | Aromin | |
| 6,026,590 A | 2/2000 | Picozza et al. | |
| 6,052,266 A | 4/2000 | Aromin | |

(Continued)

OTHER PUBLICATIONS

"RV4145A Low Power Ground Fault Interrupter," Technical Specification/Data Sheet for RV4145A Integrated Circuit, Fairchild Semiconductor, Rev. 1.0.3, pp. 1-11 (Mar. 6, 2002).

(Continued)

*Primary Examiner*—Ronald W. Leja
(74) *Attorney, Agent, or Firm*—Akin Gump Strauss Hauer & Feld, LLP

(57) ABSTRACT

An appliance leakage current interrupter (ALCI) cord set for powering an appliance includes an ALCI plug having a housing, an ALCI circuit disposed within the housing and two partially exposed contact blades coupled to an input of the ALCI circuit. The contact blades are configured to connect to an electrical receptacle. The ALCI cord set also includes a power cord and a nightlight. The power cord has a generally insulative jacket and two electrical conductors each having a first end electrically coupled to an output of the ALCI circuit and a second end electrically coupled to the appliance. The nightlight is mounted on an exterior of the housing of the ALCI plug. The nightlight is electrically coupled to the output of the ALCI circuit and is illuminated when the ALCI circuit is not tripped.

5 Claims, 3 Drawing Sheets

U.S. PATENT DOCUMENTS

| | | |
|---|---|---|
| 6,057,996 A | 5/2000 | Kim |
| 6,088,205 A * | 7/2000 | Neiger et al. ............... 361/42 |
| 6,122,155 A | 9/2000 | Aromin et al. |
| D446,350 S | 8/2001 | Picozza |
| D451,481 S | 12/2001 | MacKay |
| D454,546 S | 3/2002 | MacKay |
| 6,390,647 B1 * | 5/2002 | Shaefer ................. 362/276 |
| 6,804,094 B2 * | 10/2004 | Kampmeyer ............. 361/42 |
| 2001/0046815 A1 | 11/2001 | Luu |
| 2002/0008950 A1 | 1/2002 | Kim et al. |
| 2002/0149464 A1 | 10/2002 | Santa Cruz et al. |
| 2002/0154488 A1 | 10/2002 | Leopold et al. |
| 2004/0070895 A1 * | 4/2004 | Gershen et al. ............ 361/42 |

OTHER PUBLICATIONS

Remich, Jr., Norman C. "Built-In Fire Protection," AM-Appliance Manufacturer, 1 p. (Apr. 1997).

* cited by examiner

APPLIANCE LEAKAGE CURRENT INTERRUPTER AND NIGHTLIGHT COMBINATION

BACKGROUND OF THE INVENTION

The present invention generally relates to a circuit fault detector and nightlight combination, and more specifically, to an appliance leakage current interrupter and nightlight combination.

An appliance leakage current interrupter (ALCI) is an electrical fault device that is intended to interrupt the electrical circuit to a load when a fault current to ground exceeds some predetermined value that is less than the current required to operate an overcurrent protection device protecting the supply circuit. ALCI devices are typically provided in an integral assembly as part of an appliance cord set. For example, an appliance such as a hairdryer has a permanently attached cord with a plug on the end and the plug includes an integrally mounted ALCI or GFI circuit for the user's protection. One basic, integrally mounted ALCI circuit is disclosed in U.S. Pat. No. 5,943,199 of Aromin.

Other integrally mounted fault detector circuits provided in cord sets also include an indicator lamp or light emitting diode (LED) which turns on when a fault condition has occurred and the circuit has been tripped by the fault detector circuit. U.S. Pat. No. 5,198,955 of Wiliner discloses a miniature circuit interrupter formed within a plug and having an LED which lights to indicate a ground fault condition.

A nightlight is a small lamp or other illumination device that is left on overnight to provide low level illumination for children or people not familiar with the area for example. Some nightlights are formed as a single, self-supporting unit that can be plugged directly into a conventional wall receptacle without a cord or the need to place the nightlight on a surface. One such nightlight is disclosed in U.S. Pat. No. 6,390,647 B1 of Shaefer which also discloses additional features of such a self-supporting nightlight.

What is needed but not provided by the prior art is an fault detector plug and nightlight combination. Further, what is needed but not provided by the prior art is an ALCI plug set for an appliance and integrally mounted nightlight combination.

BRIEF SUMMARY OF THE INVENTION

Briefly stated, the present invention comprises an appliance leakage current interrupter (ALCI) cord set for powering an appliance. The ALCI cord set includes an ALCI plug having a housing, an ALCI circuit disposed within the housing and two partially exposed contact blades coupled to an input of the ALCI circuit. The contact blades are configured to connect to an electrical receptacle. The ALCI cord set also includes a power cord and a nightlight. The power cord has a generally insulative jacket and two electrical conductors each having a first end electrically coupled to an output of the ALCI circuit and a second end electrically coupled to the appliance. The nightlight is mounted on an exterior of the housing of the ALCI plug. The nightlight is electrically coupled to the output of the ALCI circuit and is illuminated when the ALCI circuit is not tripped.

The present invention also comprises a fault interrupter cord set for powering a load. The fault interrupter cord set includes a fault interrupter plug, a power cord, and a nightlight. The fault interrupter plug has a housing, a fault interrupter circuit disposed within the housing and two partially exposed contact blades coupled to an input of the fault interrupter circuit. The contact blades are configured to connect to an electrical receptacle. The power cord has a generally insulative jacket and two electrical conductors each having a first end electrically coupled to an output of the fault interrupter circuit and a second end electrically coupled to a load. The nightlight is mounted on an exterior of the housing of the fault interrupter plug. The nightlight is electrically coupled to the output of the fault interrupter circuit and is illuminated when the fault interrupter circuit is not tripped.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
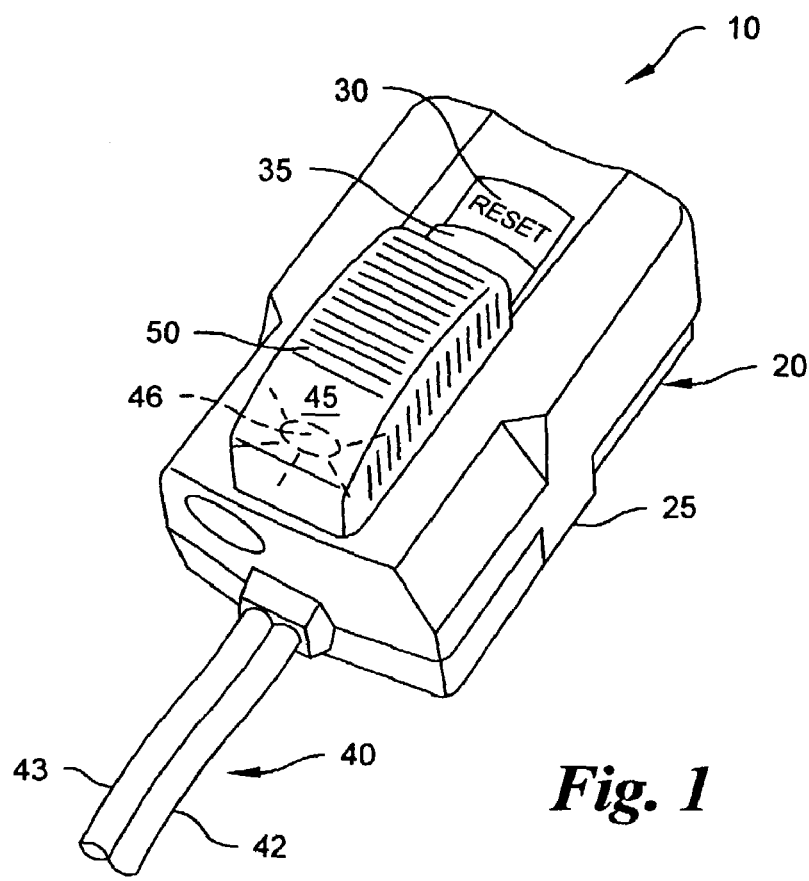
FIG. 1 is a perspective view of an appliance leakage current interrupter (ALCI) cord set for powering an appliance in accordance with the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the object discussed and designated parts thereof. The terminology includes the words above specifically mentioned, derivatives thereof and words of similar import. Additionally, the word "a" as used in the claims and in the corresponding portions of the-specification, means "one or more than one."

Figure 2:
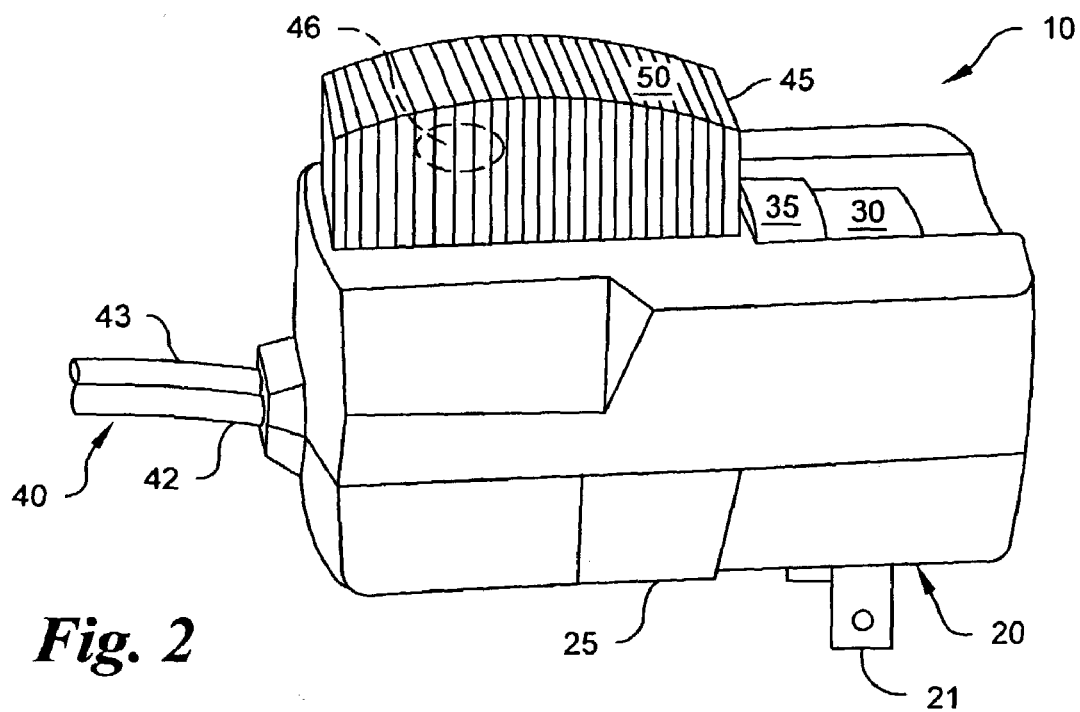
FIG. 2 is a side elevational view of the ALCI cord set of FIG. 1.

In the drawings, like numerals are used to indicate like elements throughout. Referring to the drawings in detail, there is shown in FIGS. 1–2 an appliance leakage current interrupter (ALCI) cord set 10 for powering an appliance (not shown) in accordance with the present invention. The ALCI cord set 10 includes an ALCI plug 20, a power cord 40 and a nightlight 45. The ALCI plug 20 has a housing 25, an ALCI circuit 60 (FIG. 3A) disposed within the housing 25 and two partially exposed contact blades 21 coupled to an input IN of the ALCI circuit 60. The contact blades 21 are configured to connect to a conventional electrical receptacle as is known in the art. The power cord 40 has a generally insulative jacket and two electrical conductors 42, 43 each having a first end electrically coupled to an output OUT of the ALCI circuit 60 and a second end electrically coupled to the appliance. The ALCI plug 20 also includes a test button 35 and a reset button 30 for testing the ALCI circuit 60 and resetting the ALCI circuit 60 from a tripped, faulted or tested condition, respectively.

The nightlight 45 is mounted on an exterior of the housing 25 of the ALCI plug 20 and includes a lamp 46 and a lens cover 50. The lamp 46 may be a light bulb, a light emitting diode (LED), an LED array or any other structure capable of illuminating by the application of electrical power as is known in the art. The lens cover 50 is preferably a translucent polymeric material, but may be clear, tinted and/or glass without departing from the present invention. The lamp 46 of the nightlight 45 is electrically coupled to the output OUT of the ALCI circuit 60 and is illuminated when the ALCI circuit 60 is not tripped (i.e., when there is no detected fault condition and the ALCI circuit 60 has been reset). The ALCI cord set 10 is preferably used in combination with an appliance like a hair dryer (not shown) which may be left plugged into a wall receptacle (not shown) such that the nightlight 45 provides illumination to the area surrounding the ALCI cord set 10.

The ALCI cord set 10 may optionally include an on/off switch SW47 electrically coupled between the output OUT of the ALCI circuit 25 and the lamp 46 of the nightlight 45. The on/off switch SW47 has a first position to block power flow from the output OUT of the ALCI circuit 60 to the lamp 46 of the nightlight 45 and a second position to allow power flow from the output OUT of the ALCI circuit 60 to the lamp 46 of the nightlight 45. Of course, other combinations of switches having other functionality may be utilized without departing from the invention. Further, it is contemplated that the on/off switch SW47 is actuated by an automatic sensor such as an ambient light (or lack of light) sensor, a motion sensor, a sound sensor and the like.

Figure 3A:
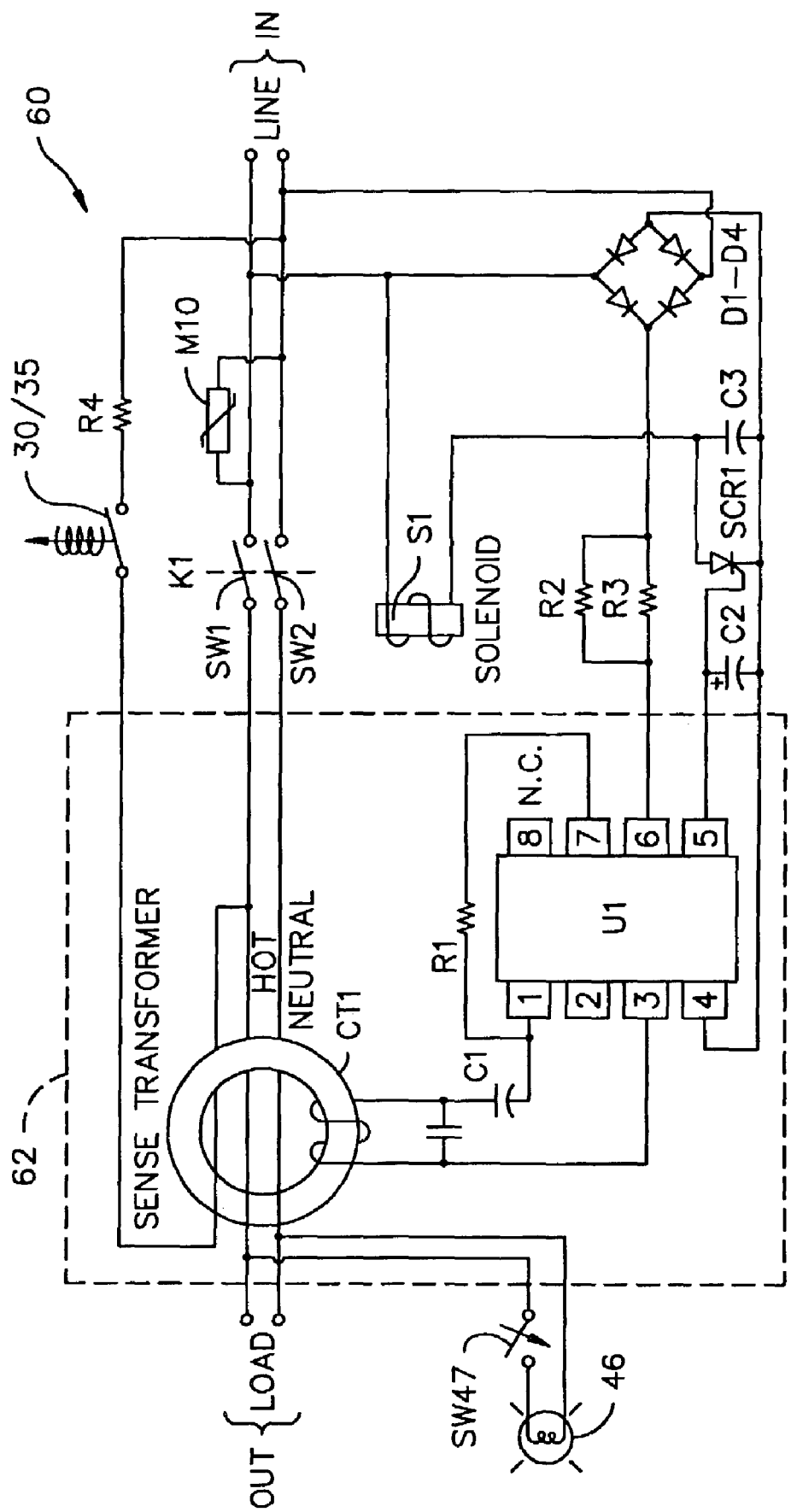
FIG. 3A is a schematic circuit diagram of an ALCI control circuit for use with the ALCI cord set of FIG. 1.

Referring to FIG. 3A, the ALCI circuit 60 includes a current sensing coil CTI, an interrupting relay K1 and a fault detection circuit 62. The fault detection circuit 62 includes a fault detector integrated circuit (IC) U1 which is configured to respond to detected current differentials by energizing/de-energizing a control output. The relay K1 includes a solenoid S1 which is coupled to the control output of the fault detector IC U1 by a silicon controlled rectifier (SCR), as shown. The ALCI circuit 60 includes other suitable biasing components such as metal oxide varistor (MOV) M10, resistors R1–R4, capacitors C1–C3 and diodes D1–D4. The current sensing coil CT1 is configured to sense electrical current flowing out of the ALCI circuit 60 and to sense current flowing back into the output OUT of the ALCI circuit 60. The interrupting relay K1 has contacts SW1, SW2 electrically coupled between the input IN and the output OUT of the ALCI circuit 60. The contacts SW1, SW2 have a closed position to allow power flow from the input IN of the ALCI circuit to the output OUT of the ALCI circuit and a tripped or open position to block power flow from the input IN of the ALCI circuit 60 to the output OUT of the ALCI circuit 60. The fault detection circuit 62 is responsive to the current sensing coil CT1 and is configured to actuate the interrupting relay K1 from the closed position to the tripped position upon detection of a fault leakage current. The fault leakage current which causes the ALCI circuit 60 to actuate the interrupting relay is between about 2 milliamps and about 8 milliamps, but preferably, the fault leakage current which causes the ALCI circuit 60 to trip is about 6 milliamps. Of course, this is but one possible implementation of the ALCI circuit 60 and other designs may be implemented using the same or other components without departing from the present invention.

Figure 3B:
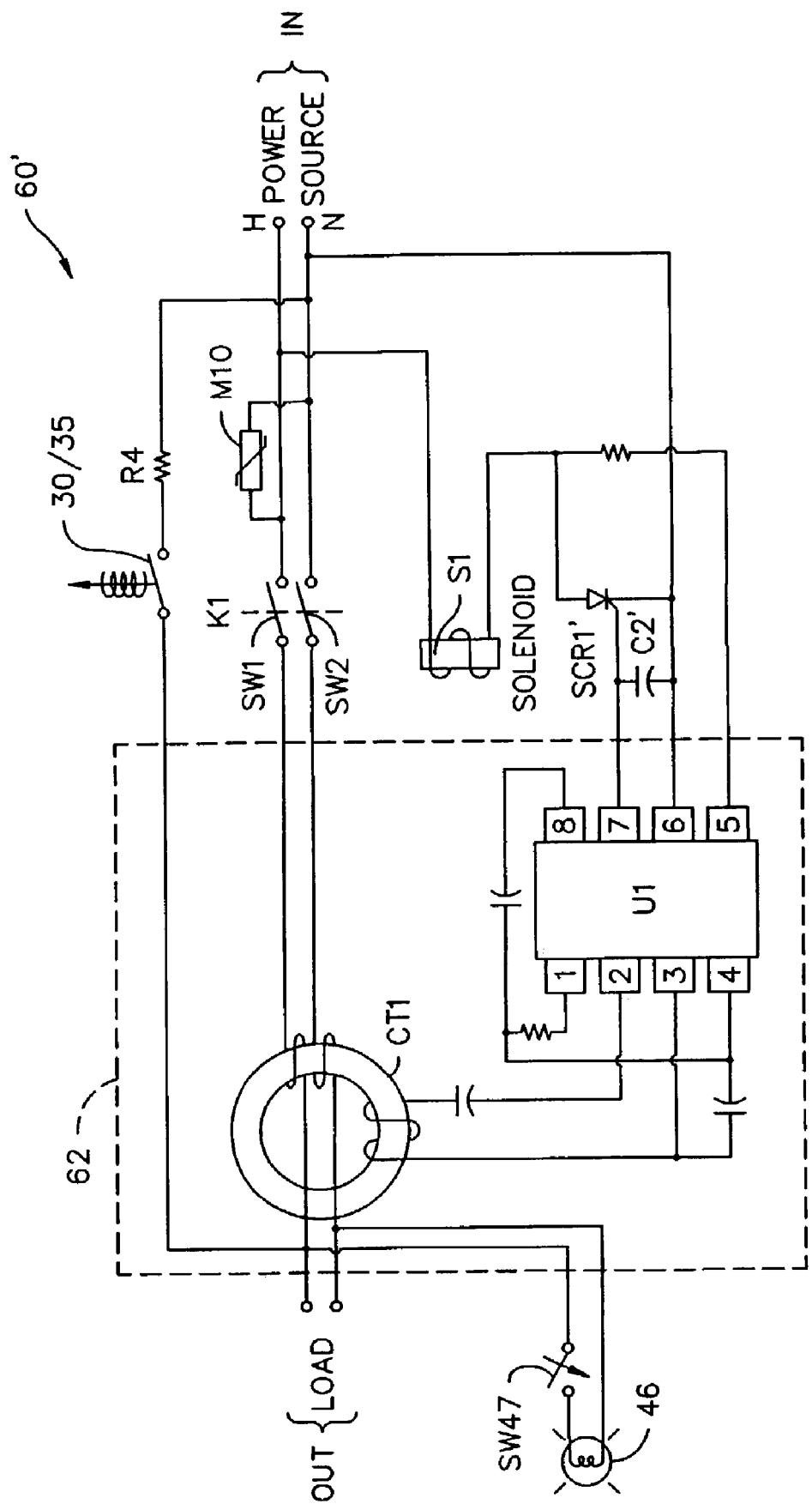
FIG. 3B is a schematic circuit diagram of an alternate ALCI control circuit for use with the ALCI cord set of FIG. 1.

For example, FIG. 3B is a different implementation of an ALCI circuit 60', which varies slightly from FIG. 3A. The ALCI circuit 60' is a simplified design which does not include a diode rectifier bridge (D1–D4 of ALCI circuit 60) and has a slightly modified input filtering scheme. But, it should be noted that ALCI circuits 60, 60' are generally well known in the art. Any ALCI circuit 60, 60' may be utilized in combination with a nightlight 45 disposed on the exterior of the housing 25 of the fault interrupter plug 20 without departing from the spirit of the invention as would be obvious to one skilled in the art.

While described herein as an ALCI circuit 60, 60', the ALCI circuit 60, 60' may be other types of fault detection circuits used in combination with a nightlight 45 mounted on the exterior of the housing 25 of the fault interrupter plug 20, such as a ground fault circuit interrupter (GFI) (not shown) and an arc fault detector circuit interrupter (not shown) as are known in the art. Furthermore, the ALCI cord set 10 may include combinations of different fault detection circuits in combination with the nightlight 45, such as a combination of an ALCI circuit 60, 60' and a GFI circuit, without departing from the broad inventive scope of the present invention.

From the foregoing, it can be seen that the present invention comprises an ALCI power cord set having a nightlight disposed on an exterior of the housing. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An appliance leakage current interrupter (ALCI) cord set for powering an appliance, the ALCI cord set comprising:

an ALCI plug having a housing, an ALCI circuit disposed within the housing and only two partially exposed contact blades coupled to an input of the ALCI circuit, the only two contact blades being configured to connect to an electrical receptacle;

a power cord having a generally insulative jacket and only a line electrical conductor and a neutral electrical conductor each having a first end electrically coupled to an output of the ALCI circuit and a second end electrically coupled to the appliance; and a nightlight including a lens cover and a lamp, the nightlight being mounted on and protruding from a surface of the housing, the lens cover being smaller in width and length than the surface of the housing the lens cover is mounted on, the lens cover protruding from the surface of the housing and defining a hollow interior, the lamp being electrically coupled to the output of the ALCI circuit and being illuminated when the ALCI circuit is not tripped, the lamp protruding into the hollow interior defined by the lens cover beyond the surface of the housing to thereby illuminate an area surrounding the ALCI cord set.

2. The ALCI cord set according to claim 1, wherein the appliance is a hair dryer.

3. An appliance leakage current interrupter (ALCI) cord set for powering an appliance, the ALCI cord set comprising:

an ALCI plug having a housing, an ALCI circuit disposed within the housing and only two partially exposed contact blades coupled to an input of the ALCI circuit, the only two contact blades being configured to connect to an electrical receptacle;

a power cord having a generally insulative jacket and only a line electrical conductor and a neutral electrical conductor each having a first end electrically coupled to an output of the ALCI circuit and a second end electrically coupled to the appliance;

a nightlight including a lens cover and a lamp, the nightlight being mounted on and protruding from a surface of the housing, the lens cover being smaller in width and length than the surface of the housing the lens cover is mounted on, the lens cover protruding from the surface of the housing and defining a hollow interior, the lamp being electrically coupled to the output of the ALCI circuit and being illuminated when the ALCI circuit is not tripped, the lamp protruding into the hollow interior defined by the lens cover beyond the surface of the housing to thereby illuminate an area surrounding the ALCI cord set; and an on/off switch electrically coupled between the output of the ALCI circuit and the nightlight, the on/off switch having a first position to block power flow from the output of the ALCI circuit to the nightlight and a second position to allow power flow from the output of the ALCI circuit to the nightlight.

4. The ALCI cord set according to claim 1, wherein the ALCI circuit comprises:

a current sensing coil configured to sense electrical current flowing out of the ALCI circuit and to sense current flowing back into the output of the ALCI circuit;

an interrupting relay having contacts electrically coupled between the input and the output of the ALCI circuit, the contacts having a closed position to allow power flow from the input of the ALCI circuit to the output of the ALCI circuit and a tripped position to block power flow from the input of the ALCI circuit to the output of the ALCI circuit; and a fault detection circuit responsive to the current sensing coil and being configured to actuate the interrupting relay from the closed position to the tripped position upon detection of a fault leakage current.

5. The ALCI cord set according to claim 4, wherein the fault leakage current is between about 2 milliamps and about 8 milliamps.

* * * * *